United States Patent [19]

Mori et al.

[11] Patent Number: 5,223,575
[45] Date of Patent: Jun. 29, 1993

[54] MOISTURE-CROSSLINKABLE PRIMER FOR POLYOLEFINS

[75] Inventors: Masahito Mori; Kohske Torii, both of Takatsuki; Hirokazu Okamoto, Shijonawate, all of Japan

[73] Assignee: Sunstar Giken Kabushiki Kaisha, Osaka, Japan

[21] Appl. No.: 442,138

[22] Filed: Nov. 28, 1989

[30] Foreign Application Priority Data

Nov. 29, 1988 [JP] Japan .................. 63-303226

[51] Int. Cl.$^5$ .................................. C08F 8/30
[52] U.S. Cl. ........................... 525/102; 525/105
[58] Field of Search ............ 525/105, 100, 102

[56] References Cited

U.S. PATENT DOCUMENTS

| | | | |
|---|---|---|---|
| 4,147,685 | 4/1979 | Smith, Jr. | 525/100 |
| 4,837,274 | 6/1989 | Kawakubo et al. | 525/100 |
| 4,900,772 | 2/1990 | Imanaka et al. | 524/303 |
| 4,904,732 | 2/1990 | Iwahara et al. | 525/100 |
| 4,960,809 | 10/1990 | Yamaya et al. | 525/104 |

FOREIGN PATENT DOCUMENTS 52-069460 6/1977 Japan .
53-129290 11/1978 Japan .
62-265301 11/1987 Japan .

Primary Examiner—Ralph H. Dean, Jr.
Attorney, Agent, or Firm—Wegner, Cantor, Mueller & Player

[57] ABSTRACT

A moisture-crosslinkable primer which comprises a solution of a hydrogenated polybutadiene into which has been introduced a silyl group of the formula:

$$-\underset{\underset{R_n}{|}}{Si}-R'_{3-n}$$

wherein R is an alkyl group having 1 to 5 carbon atoms, R' is an alkoxy group having 1 to 5 carbon atoms or a halogen atom, and n is an integer of from 1 to 3, in an organic solvent, which has excellent heat-resistant adhesion and durable adhesion and is useful for adhering between polyolefinic substances or between polyolefinic substances and other organic substances.

1 Claim, No Drawings

MOISTURE-CROSSLINKABLE PRIMER FOR POLYOLEFINS

This invention relates to a moisture-crosslinkable primer for polyolefins, more particularly, to a moisture-crosslinkable primer comprising a solution in an organic solvent of a hydrogenated polybutadiene into which a silyl group has been introduced which has excellent heat-resistant adhesion and durable adhesion and is suitable for adhering between polyolefinic substances or between an polyolefinic substance and other organic substance.

PRIOR ART

There are recently increased demands for adhering between low polar polyolefinic substances (e.g. polypropylene (PP) plates, polyethylene (PE) plates, polyethylene (PE) foams, polypropylene (PP) foams, ethylene-propylene-diene terpolymer (EPDM) rubbers, ethylene-propylene rubbers (EPR), etc.), or between the polyolefinic substances and other organic substances (e.g. polyvinyl chloride (PVC) sheets, polyvinyl chloride (PVC) foams, styrene-ethylene-butene-styrene copolymer (SEBS) plates, styrene-ethylene-propylene-styrene copolymer (SEPS) plates, styrene-isoprene-styrene (SIS) rubbers, styrene-butadiene-styrene (SBS) rubbers, etc.). In such a case, the substances have previously been treated with a primer in order to exhibit sufficient adhesion between the substances by an adhesive. As these primers for polyolefins, there have been used a solution of a base material (e.g. chlorinated polyolefin or polyolefins treated with maleic anhydride) in an organic solvent. However, the base materials to be used in such primers are not crosslinkable, and hence, the primers are inferior in heat-resistant adhesion and durable adhesion.

BRIEF DESCRIPTION OF THE INVENTION

The present inventors have intensively studied as to an improved primer suitable for polyolefins having no drawbacks as in the conventional primers as mentioned above, and with aiming at a hydrogenated polybutadiene having a reactive OH group, they have tried to use it as a material for adhering polyolefins. As a result, they have found that when a moisture-crosslinkable silyl group is introduced into the hydrogenated polybutadiene, the specific hydrogenated polybutadiene can give the desired primer having excellent heat-resistant adhesion and durable adhesion.

An object of the invention is to provide an improved primer suitable for adhering polyolefins. Another object of the invention is to provide a primer comprising a solution of a silyl group-introduced hydrogenated polybutadiene in an organic solvent which has excellent heat-resistant adhesion and durable adhesion and is suitable for adhering between polyolefinic substances or between polyolefinic substances and other organic substances. These and other objects and advantages of the invention will be apparent to those skilled in the art from the following description.

DETAILED DESCRIPTION OF THE INVENTION

The moisture-crosslinkable primer of this invention comprises a solution of a hydrogenated polybutadiene into which has been introduced a silyl group of the formula:

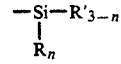

wherein R is an alkyl group having 1 to 5 carbon atoms, R' is an alkoxy group having 1 to 5 carbon atoms or a halogen atom, and n is an integer of from 1 to 3, in an organic solvent.

The hydrogenated polybutadiene used in this invention means hydrogenated polybutadiene glycols which have a terminal hydroxy group, wherein the polybutadiene has a 1,2-vinyl structure, or 1,4-trans structure alone, or in combination of 1,2-vinyl structure and 1,4-trans structure, or of 1,2-vinyl structure, 1,4-trans structure and 1,4-cis structure, or of 1,4-trans structure and 1,4-cis structure, in said hydrogenated polybutadiene having a combination of various structures, the various structures being contained in any ratio.

The introduction of the silyl group into the hydrogenated polybutadiene can be carried out by the following methods (I), (II) or (III).

METHOD (I)

A hydrogenated polybutadiene is reacted with a polyisocyanate wherein the polyisocyanate is used in an excess amount so that the active isocyanate (NCO) group of the polyisocyanate becomes excess to the hydroxy (OH) group of the polybutadiene, usually in an amount of 2 to 4 moles of the polyisocyanate to 1 mole of the hydrogenated polybutadiene, by which there is obtained a polyurethane prepolymer which has a content of an active NCO of 0.5 to 10% by weight. The reaction is usually carried out in an organic solvent which is used for preparing the primer, for example, aromatic hydrocarbons (e.g. toluene, benzene, xylene, etc.), optionally in the presence of a catalyst (e.g. dibutyl tin dilaurate, triethylamine, lead octate, etc.). The urethane prepolymer thus obtained is then reacted with an equimolar or excess amount (e.g. 4 moles) of an aminosilane or mercaptosilane compound in order to introduce the silyl group therein.

METHOD (II)

In the same manner as in the above method (I) except that the order of the reaction is exchanged, the reaction is carried out. That is, firstly an aminosilane or mercaptosilane compound is reacted with an equimolar or excess amount (usually 1 to 2 moles) of a polyisocyanate in an organic solvent as mentioned above to give a silane-modified NCO-containing compound, and then the silane-modified polyisocyanate thus prepared is reacted with a hydrogenated polybutadiene which is used in an equimolar or less amount (i.e. in an amount so that an active NCO group is remained), usually in an amount of 0.2 to 1 mole.

METHOD (III)

A hydrogenated polybutadiene is reacted with an equimolar or excess amount, preferably 2 to 4 moles, of an isocyanatosilane compound for introducing a silyl group in an organic solvent as mentioned above in the reaction product.

The polyisocyanate includes, for example, aliphatic polyisocyanates (e.g. hexamethylene diisocyanate, 2,2,4-trimethylhexamethylene diisocyanate, lysine methyl ester diisocyanate, etc.), alicyclic polyisocyanates (e.g. hydrogenated diphenylmethane diisocyanate, isophorone diisocyanate, hydrogenated tolylene diisocyanate, etc.), aromatic polyisocyanates (e.g. tolylene diisocyanate (TDI), diphenylmethane diisocyanate (MDI), naphthylene diisocyanate, xylylene diisocyanate, triphenylmethane triisocyanate, tris(4-phenylisocyanate) thiophosphate, etc.), and the like.

The aminosilane compound includes, for example, aminomethyltriethoxysilane, N-($\beta$-aminoethyl)aminomethyltrimethoxysilane, aminomethyldiethoxysilane, N-($\beta$-aminoethyl)methyltributoxysilane, $\gamma$-aminopropyltriethoxysilane, $\gamma$-aminopropylmethyldiethoxysilane, $\gamma$-aminoisobutyltrimethoxydilane, N-bis($\beta$-hydroxyethyl)-$\gamma$-aminopropyltriethoxysilane, N-($\beta$-aminoethyl)-$\gamma$-aminopropyltrimethoxysilane, N-($\beta$-aminoethyl)-$\gamma$-aminopropylmethyldimethoxysilane, N-($\beta$-aminoethyl)-$\gamma$-amino-$\beta$-methylpropyltrimethoxysilane, N-phenyl-$\gamma$-aminopropyltrimethoxysilane, and the like.

The mercaptosilane compound includes, for example, $\gamma$-mercaptopropylmethyldimethoxysilane, $\gamma$-mercaptopropyltrimethoxysilane, $\gamma$-mercaptopropylmethyldiethoxysilane, $\gamma$-mercaptopropyltriethoxysilane, $\gamma$-mercaptopropylethyldimethoxysilane, $\gamma$-mercaptopropylethyldiethoxysilane, $\gamma$-mercaptopropyldimethylmethoxysilane, $\beta$-mercaptoethylmethyldimethoxysilane, $\beta$-mercaptoethyltrimethoxysilane, $\beta$-mercaptoethyltriethoxysilane, and the like.

The isocyanatosilane compound includes, for example, $\gamma$-isocyanatopropyldimethylchlorosilane of the formula:

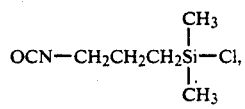

$\gamma$-isocyanatopropyltriethoxysilane of the formula:

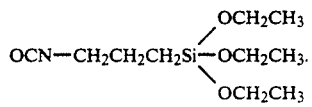

The moisture-crosslinkable primer for polyolefins of this invention is the reaction product prepared by the above methods (I), (II) or (III), which is in the form of a solution in an organic solvent, such as aromatic hydrocarbons (e.g. toluene, benzene, xylene, etc.), esters (e.g. ethyl acetate, etc.), halogenated aliphatic hydrocarbons (e.g. methylene chloride, 1,1,1-trichloroethylene, etc.), that is, a solution in an organic solvent of a hydrogenated polybutadiene into which a silyl group has been introduced, and has usually a solid component of 1 to 20% by weight. The primer may optionally be incorporated with an appropriate amount of an active silyl group-containing compound (e.g. the above aminosilane compounds, etc.) in order to enhance the adhesion between the primer and an adhesive to be applied thereon, or an appropriate amount of the conventional film-forming resins, dehydrating agents, plasticizers, and the like.

The primer of this invention can be applied for adhering various polyolefin substances with various types of adhesives with excellent heat-resistant adhesion and durable adhesion.

This invention is illustrated by the following Examples but should not be construed to be limited thereto.

EXAMPLES 1 TO 4

A primer is prepared by the method (I) as follows.

A hydrogenated polybutadiene in an amount as shown in Table 1 is dissolved in toluene, and thereto are added MDI and a catalyst. The mixture is reacted at 80° C. for 4 hours to give a urethane prepolymer. To the reaction product is added an aminosilane or mercaptosilane compound, and the mixture is reacted at 80° C. for 6 hours to prepare a primer composition.

TABLE 1

|  | (part by weight) Examples | | | |
|---|---|---|---|---|
|  | 1 | 2 | 3 | 4 |
| Hydrogenated polybutadiene *1 | 100 | 100 | 100 | 100 |
| Toluene | 900 | 900 | 900 | 900 |
| MDI | 25 | 25 | 25 | 25 |
| Reaction catalyst *2 | 1 | 1 | 1 | 1 |
| Aminosilane compound *3 | 25 | 30 | — | — |
| Mercaptosilane compound *4 | — | — | 20 | 25 |

*1 Polytail H (manufactured by Mitsubishi Kasei Corp.)
*2 A 10% solution of dibutyl tin dilaurate in toluene
*3 N-Phenyl-$\gamma$-aminopropyltrimethoxysilane (KBM 573, manufactured by Shin-Etsu Chemical Co., Ltd.)
*4 $\gamma$-Mercaptopropyltrimethoxysilane (KBM 803, manufactured by Shin-Etsu Chemical Co., Ltd.)

EXAMPLES 5 AND 6

A primer is prepared by the method (II) as follows.

An aminosilane (KBM 573) or mercaptosilane (KBM 803) in an amount as shown in Table 2 is dissolved in toluene, and thereto is added MDI. The mixture is reacted at 80° C. for 4 hours to give an active NCO-containing silane compound. The compound is added to a mixture of a hydrogenated polybutadiene (Polytail H) and toluene, and the mixture is reacted in the presence of the same catalyst as used in Examples 1-4 at 80° C. for 6 hours to prepare a primer composition.

TABLE 2

|  | (part by weight) Examples | |
|---|---|---|
|  | 5 | 6 |
| Aminosilane (KBM 573) | 25 | — |
| Mercaptosilane (KBM 803) | — | 20 |
| Toluene | 50 | 45 |
| MDI | 25 | 25 |
| Hydrogenated polubutadiene | 100 | 100 |
| Toluene | 900 | 900 |
| Reaction catalyst | 1 | 1 |

EXAMPLES 7 TO 9

A primer is prepared by the method (III) as follows.

A hydrogenated polybutadiene (Polytail H) in an amount as shown in Table 3 is dissolved in toluene, and thereto are added an isocyanatosilane and a catalyst. The mixture is reacted at 80° C. for 6 hours. The reaction mixture is cooled to lower temperature and thereto is optionally added an aminosilane to prepare a primer composition.

TABLE 3

|  | (part by weight) Examples | | |
|---|---|---|---|
|  | 7 | 8 | 9 |
| Hydrogenated polybutadiene | 100 | 100 | 100 |
| Toluene | 900 | 900 | 900 |
| Isocyanatosilane *5 | 20 | 25 | 25 |
| Reaction catalyst *2 | 1 | 1 | 1 |

TABLE 3-continued

| | (part by weight) Examples | | |
|---|---|---|---|
| | 7 | 8 | 9 |
| Aminosilane compound *6 | — | — | 10 |

*5 3-Isocyanatopropyltriethoxysilane (Y-9030, manufactured by Nippon Yuniker K.K.)
*6 N-(β-aminoethyl)-γ-aminopropyltrimethoxysilane (KBM 603, manufactured by Shin-Etsu Chemical Co., Ltd.)

REFERENCE EXAMPLE 1

A primer is prepared by dissolving a hydrogenated polybutadiene (Polytail H) (100 parts by weight) in toluene (900 parts by weight).

REFERENCE EXAMPLE 2

A primer is prepared by dissolving a hydrogenated polybutadiene (Polytail H) (100 parts by weight) in toluene (900 parts by weight) and adding thereto the same aminosilane (KBM 603) as used in Example 9 (10 parts by weight).

TEST OF ADHESION STRENGTH

A polypropylene (PP) plate (IP-407, manufactured by Mitsui Petroleum Co., Ltd.) was applied with each primer as prepared in the above Examples and Reference Examples, and then dried at room temperature for one hour. Thereafter, a urethane adhesive (Penguin Cement #903, manufactured by Sunstar Giken K.K.) was applied onto the primer layer of the plate. Separately, a polyvinyl chloride (PVC) sheet (Orsia MP-053, manufactured by Sunstar Giken K.K.) was also applied with the same urethane adhesive as above and dried at room temperature for 5 minutes. The PVC sheet and the PP plate were laminated to each other with facing the adhesive layers thereof and pressed with a roller of 5 kg to give a test piece.

The test pieces thus prepared were subjected to test of adhesion strength under various conditions, wherein the peel strength was measured by peeling the test pieces at an angle of 180°. The results are shown in Table 4.

TABLE 4

| | Primers in Examples | | | | | | | | | in Ref. Examples | |
|---|---|---|---|---|---|---|---|---|---|---|---|
| | 1 | 2 | 3 | 4 | 5 | 6 | 7 | 8 | 9 | 1 | 2 |
| Initial peel strength (kg/in) *7 | 2.8 | 2.6 | 2.7 | 2.7 | 2.3 | 2.6 | 2.8 | 2.9 | 2.1 | 0.7 | 0.8 |
| Dry peel strength (kg/in) *8 | 7.0 | 6.8 | 6.9 | 6.7 | 6.6 | 7.3 | 7.1 | 7.2 | 7.5 | 1.0 | 0.9 |
| Heat-resistant creep (mm) *9 | 0 | 0 | 0 | 0 | 0 | 0 | 0 | 0 | 0 | More than 75 | More than 75 |
| Peel strength after aging with heating (kg/in) *10 | 6.8 | 6.6 | 5.9 | 6.1 | 6.4 | 5.6 | 5.8 | 5.2 | 5.9 | 0.3 | 0.2 |
| Peel strength after aging with heating under moisture (kg/in) *11 | 7.0 | 6.3 | 6.9 | 6.1 | 6.5 | 6.2 | 5.5 | 5.4 | 5.8 | 0.2 | 0.2 |

*7 Measured 10 minutes after lamination.
*8 Measured after the test piece was kept at 20° C. for 24 hours.
*9 The Test piece was kept at 20° C. for 24 hours and given with a stationary load of 100 g/25 mm at 100° C. for 24 hours, and then, the peeled length was measured.
*10 Measured after the test piece was kept at 20° C. for 24 hours and subjected to aging at 100° C. for 400 hours.
*11 Measured after the test piece was kept at 20° C. for 24 hours and subjected to aging at 50° C. under 95% relative humidity for 400 hours.

What is claimed is:

1. A moisture-crosslinkable primer comprising a solution of a hydrogenated polybutadiene into which has been introduced a silyl group of the formula:

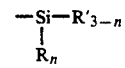

wherein R is an alkyl group having 1 to 5 carbon atoms, R' is an alkoxyl group having 1 to 5 carbon atoms or a halogen atom, and n is an integer of from 1 to 3, in an organic solvent, prepared by reacting a hydrogenated polybutadiene with a polyisocyanate in an organic solvent wherein the polyisocyanate is used in an amount of 2 to 4 moles to 1 mole of the hydrogenated polybutadiene to give a polyurethane prepolymer which has a content of an active NCO of 0.5 to 10% by weight, followed by reacting the polyurethane prepolymer with an equimolar or excess amount of an aminosilane compound.

* * * * *